United States Patent [19]
Janssen

[11] 4,034,405
[45] July 5, 1977

[54] TELEVISION FACSIMILE TRANSMISSION SYSTEM

[75] Inventor: Peter Johannes Hubertus Janssen, Eindhoven, Netherlands

[73] Assignee: U.S. Philips Corporation, New York, N.Y.

[22] Filed: Nov. 3, 1975

[21] Appl. No.: 628,098

[30] Foreign Application Priority Data

Nov. 20, 1974 Netherlands .................. 7415098

[52] U.S. Cl. ............................................ 358/147
[51] Int. Cl.² ......................................... H04N 7/08
[58] Field of Search .......... 178/5.6, 5.8 R, DIG. 23; 358/142, 146, 147

[56] References Cited
UNITED STATES PATENTS

| 3,493,674 | 2/1970 | Houghton | 178/5.6 |
| 3,726,992 | 4/1973 | Eguchi | 178/5.6 |

*Primary Examiner*—John C. Martin
*Attorney, Agent, or Firm*—Frank R. Trifari; Henry I. Steckler

[57] ABSTRACT

Facsimile transmission can be effected in a conventional television system by means of code words which occur in a television line period in a field blanking interval. Transmission in the UHF band does not give rise to specific problems, but transmission in the VHF band does, in particular in that pulse disturbances occur. The influence of these disturbances can be eliminated by transmitting the same facsimile information during two (or more) successive line periods. The receiver is provided with a circuit which includes three delay devices, one having a delay time equal to a line period and the other two having delay times equal to at least the duration of a facsimile code word. The pulse disturbance is detected by means of a superposition stage and a signal detector, and the undisturbed code word is supplied via a change-over stage to a storage stage.

5 Claims, 2 Drawing Figures

TELEVISION FACSIMILE TRANSMISSION SYSTEM

The invention relates to a television facsimile transmission system comprising a transmitter and a receiver, in which system the facsimile information is transmitted in the form of code words which occur in at least one line period in a television field blanking interval, and to a transmitter and a receiver suitable for use in such a system.

Such a system is described in U.K. Pat. No. 1,370,535. It is stated therein that in the conventional television receiver specific facsimile apparatus is provided to separate, from the received television signal, the digital facsimile information which is in the form of code words and occurs in one or more line periods in the field blanking interval. The facsimile code words are stored until after many frame periods an entity of related facsimile information, for example a page of text, has been received, whereupon a decoding circuit becomes operative to convert the digital facsimile information into a video signal suitable for repetitive display via the conventional display device of the television receiver.

When the television signal is transmitted in the UHF band (0.3 to 3 GHz) no difficulties arise. This is in contradistinction to transmission in the VHF band (30 to 300 MHz) in which among other disturbances impulsive ones occur. These pulse disturbances in general have a duration between ½ and from 2 to 5 microseconds. When using negative-modulation signal transmission the pulse disturbances would affect the synchronisation of the receiver but for the fact that in the conventional receivers the synchronizing circuits are protected therefrom. In the television picture displayed the short-duration pulse disturbances, which would be perceptible as black dots, are not seen because of the persistance of vision of the eye.

Thus the short-duration pulse disturbances which occur in the VHF band do not perceptibly interfere with the conventional television picture. This is in contradistinction to what happens in the case of facsimile information, for here the pulse disturbances will change the code words so that in the final display of the whole of the facsimile information received and stored the displayed picture is unacceptably disturbed, i.e. irrecognisable or illegible.

It is an object of the present invention to provide a television facsimile transmission system which is suitable for the VHF band and in which any pulse disturbances do not unacceptably disturb the facsimile information stored for display. The system according to the invention is characterized in that the transmitter, which operates in the VHF band, in at least two successive line periods in the field blanking interval transmits the same facsimile information per line period, the receiver including a facsimile circuit which comprises a delay device which is connected to a circuit input and has a delay time of one line period, a superposition stage which is connected to the said circuit input and to the output of the delay device, and a signal detector which is connected to the superposition stage and, for control, is connected to a control input of a changeover stage having two signal inputs and one signal output, one signal input being connected to the circuit input via a delay device having a delay time equal to at least the duration of a facsimile code word whilst the other signal input is connected to the output of the line-period delay device via a delay device having the same facsimile code word delay time.

A transmitter suitable for use in a television facsimile transmission system according to the invention is characterized in that the transmitter has a transmitter section which includes a signal separator having an input to which a video facsimile signal is supplied, the facsimile information occurring in a line period in the field blanking interval, which signal separator has a first output for separated facsimile information, which output is connected to a delay device having a delay time of one line period, the output of the delay device and a second output of the signal separator, at which the video facsimile signal which is allowed to pass appears, being connected to a superposition stage the output of which is connected to a transmitter stage in the transmitter section.

A receiver suitable for use in a television facsimile transmission system according to the invention is characterized in that the circuit input of the said facsimile circuit is coupled to an output of a signal separator which has an input to which the video facsimile signal is supplied, the output of the change-over stage being connected to the circuit output which via a signal processing and storing stage is coupled to a television display device.

An embodiment of the invention will now be described by way of example, with reference to the accompanying diagrammatic drawings, in which.

Figure 1:
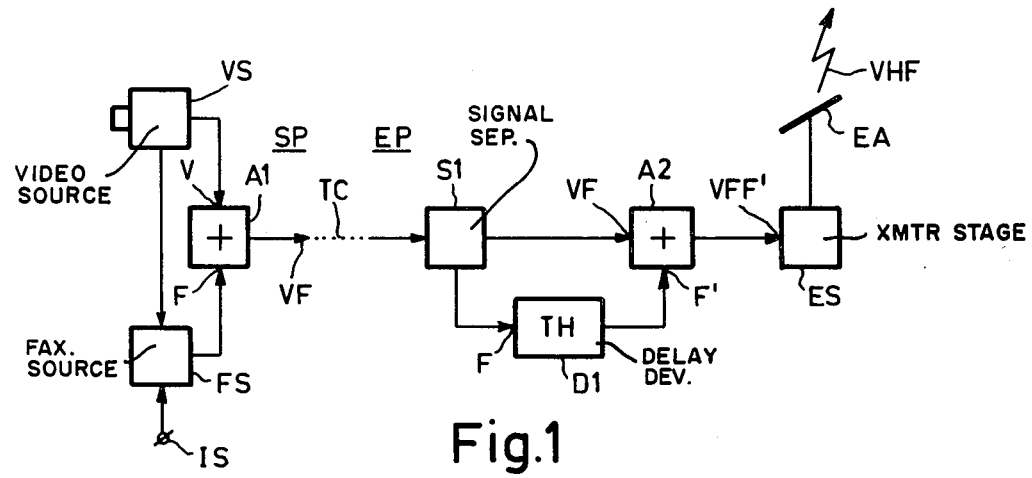
FIG. 1 is a block diagram of a transmitter according to the invention.

FIG. 1 shows in block-schematic form a television facsimile transmitter which comprises a signal source section SP and a transmitter section EP which are remote from one another and are coupled to one another by a transmission channel TC. The signal source section SP comprises a video signal source VS, a facsimile signal source FS and a superposition stage A1 to inputs of which the sources VS and FS are connected. The video signal source VS may, for example, be a television camera by means of which a scene is televised. The facsimile signal source FS has an input IS to which, for example, signals are applied under the control of which the source FS delivers code words which correspond to give facsimile information. Sitnal source FS may alternatively be a television camera scanning the facsimile information. The Figure shows a connection between the video signal source FS and the facsimile signal source FS such that the latter source delivers the facsimile code words in a given line period only during a television field blanking interval. The facsimile code words can be formed by clock pulses which give a bit rate of, for example about 7 Mbit/second. The code words may be, for example, 8-bit code words. Synchronizing, deflecting, clock-pulse and other auxiliary-signal sources are not shown, because they are not of importance for an understanding of the invention; the same applies to signal amplifiers, correcting stages, etc.

The sources VS and FS supply a video signal V and a facsimile signal F respectively to the superposition stage A1 which supplies a combined video facsimile signal VF to the transmission channel TC. The signal VF includes the synchronizing, equalizing and blanking signals commonly use in television. In practice, the stage A has further inputs to which are supplied measuring, testing and other signals which, accommodated in the remaining, still free line periods of the vertical blanking time, are presented in the signal source section of SP for transmission by the transmission channel TC.

The transmission channel TC is connected in the transmitter section EP to a signal separator S1 which has a first output, at which the separated facsimile signal F appears, and a second output for delivering, for example, the video facsimile signal VF which is allowed to pass. The facsimile signal F is supplied to a delay device D1 having a delay time equal to a line period TH. The output of the delay device D1, at which a facsimile signal F' delayed by oneline period appears, is connected to an input of a superposition stage A2 another input of which is connected to that output of the signal separator S1 at which the signal VF appears. Thus the output of the stage A2 carries a video facsimile signal VFF' which is composed of the (conventional) video signal V, the initial facsimile signal F, which in a line period in the field blanking interval provides the facsimile information, and the delayed facsimile signal F', which in a subsequent line period in the field blanking interval provides the same facsimile information once more. Obviously the repeated facsimile information may be given with opposite polarity. The signal VFF' is applied to the transmitting stage ES of the transmitter shown in FIG. 1 which has a transmitting antenna EA. The transmitting stage ES includes a carrier oscillator supplying a carrier signal which is amplitude-modulated by the signal VFF' and the frequency of which lies in the VHF band, i.e. between 30 and 300 MHz. Negative modulation is used in which the carrier amplitude corresponds to the level of the (television) synchronizing signal in the video signal.

Forming the signal VFF' in the transmitter section EP provides the advantage that the repeated facsimile information in the second line period (F') need not be transmitted through the channel TC so that the line period which thus during this transmission still is free can be used for transmitting measuring and testing signals. The signal separator S1 is assumed to separate the measuring and testing signals included in the signal VF transmitted through the channel TC, so that the signal VF which is supplied to the superposition stage A2 contains the video and facsimile information only.

Figure 2:
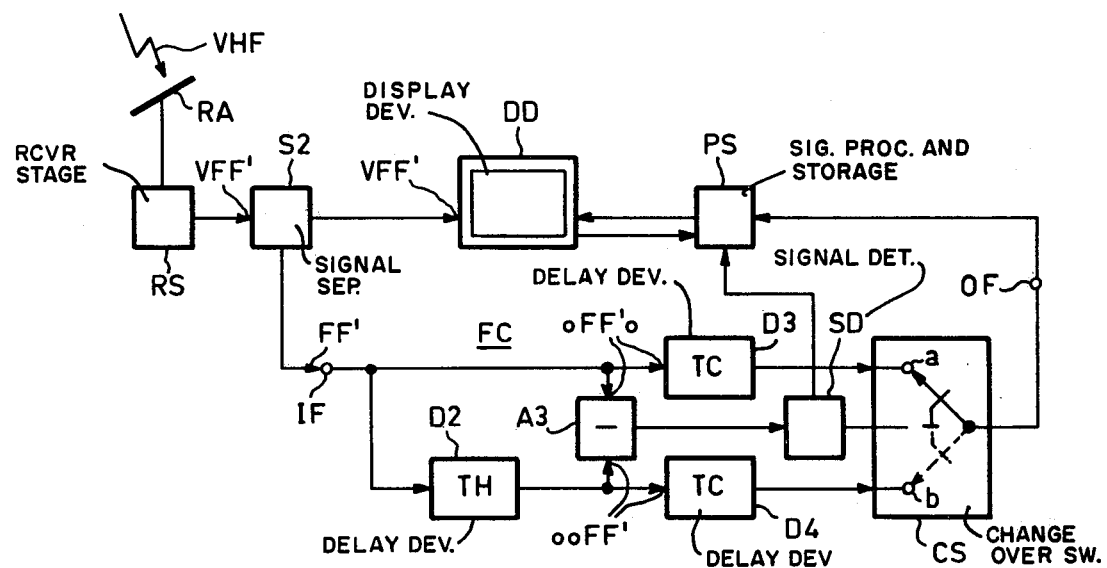
FIG. 2 is a block diagram of a receiver according to the invention.

The receiver shown in FIG. 2 receives the signal in the VHF band via a receiving antenna RA which supplies it to a receiver stage RS. The construction of the receiver stage RS will not be described in detail because it is conventional and not of importance to an understanding of the invention. It is assumed that the receiver stage RS delivers the signal VFF'.

The signal VFF' in the receiver shown in FIG. 2 would be identical with the signal VFF' in the transmitter shown in FIG. 1 if during the transmission from transmitter to receiver no disturbances, noise and other signal distortions would occur. Especially with transmission in the VHF band shot-duration pulse disturbances occur which have durations between ½ and from 2 to 5 $\mu$s. These disturbances temporarily increase the transmitted VHF signal, which with respect to the signal VFF' transmitted via negative modulation means that the blank level is introduced in it whilst original information is lost.

In the receiver shown in FIG. 2 the signal VFF' is supplied to a signal separator S2 which at one output delivers a signal FF' and at another output the signal VFF'. The signal VFF' is applied to a display device DD which displays the video information contained in the signal V, whereas the facsimile information FF', which occurs in the field blanking interval, is blanked by the convention blanking circuits.

The signal FF' which is supplied by the signal separator S2 and contains the same facsimile information, possibly with altered polarity, during two successive line periods in the field blanking interval is applied to an input IF of a facsimile circuit FC. The input IF is connected to an input of a delay device D2 having a delay time equal to a line period TH, to an input of a superposition stage A3 and to an input of a delay device D3 having a delay time TC which is at least equal to the duration of a facsimile code word. For an 8-bit code word and a bit rate of about 7 Mbit/second the delay time TC is about 1.14 $\mu$s. The delay time TH may be 64$\mu$s. The output of the delay device D2 is connected to another input of the stage A3 and to the input of a delay device D4 which also has a delay time TC. The output of the stage A3 is connected to an input of a signal detector SD which has a first input which is connected to a control input of a change-over stage CS, and a second output connected to a control input of a signal processing and storing stage PS. The change-over stage CS has two signal inputs which are connected to the outputs of the delay devices D3 and D4 respectively. The output of the change-over stage CS, which output in a position $a$ is connected to the delay device D3 and in a position $b$ to the delay device D4, is connected via an output OF of the facsimile circuit FC to a signal input of the stage PS. The stage PS has a signal output and a control input both connected to the display device DD. The display device DD is assumed to be provided with a selection switch for either conventional video display or facsimile display.

The facsimile circuit FC having the input IF and the output OF operates as follows. During two successive line periods in each field blanking interval the signal FF' contains the facsimile information in the code words. For example, 52 $\mu$s of each line period of, for example, 64 $\mu$s are used for transmitting the facsimile information. A first part of the transmission time is used for addressing, synchronizing and starting purposes whilst the remainder contains the 8-bit code words for the facsimile information. Owing to the transmission in the VHF band pulse disturbances occur which briefly produce black level in the signal FF' with consequent loss of information. In FIG. 2, the signal FF' at the delay device D3 and the stage A3 is shown as a signal oFF'o, where $o$ means: there is no facsimile information in a line period, F means: there is facsimile information of line-period duration in the field blanking interval, and F' denotes the repeated facsimile information in the next subsequent line period. The delay device D2 delivers a signal ooFF', because the signal oFF'o is delayed one line period. The signal part F' of the signal oFF'o occurs simultaneously with the signal part F of the signal ooFF' so that in the absence of a pulse disturbance, which means that F' is identical with F, the superposition stage A3, which supplies a signal F' − F, does not deliver a signal. If, however, a pulse disturbance has occurred during transmission, for example in the signal part F' of the signal oFF'o, with the consequent introduction of black level, the stage A3 delivers a negative signal -F. A pulse disturbance in the signal part F of the signal ooFF' with consequent introduction of black level causes the stage A3 to deliver a positive signal F'. The stage A3 is operative in the facsimile information part in the line period for 8-bit code word. At the end of the code word the signal detector SD sets (or holds) the change-over stage CS in the position $a$ or $b$ when the disturbance occurs in the signal part F of the signal ooFF' or in the signal part F' of the signal oFF'o respectively. The delay devices D3 and D4 are provided for bridging the code word duration. When both signal parts are free from disturbances no change-over is effected. During the line period in which the signal detector SD is operative (signal part F' in the signal oFF'o or signal part F in the signal ooFF') the facsimile signal (F' or F respectively) supplied by the change-over stage CS is supplied for storage to the signal processing and storing stage PS which for this purpose has its control input connected to the detector SD.

By means of the facsimile circuit FC having the input IF and the output OF the storage stage PS has disturbance-free facsimile information supplied to it when the code in one line period or the other is disturbed by a VHF pulse disturbance. The likelihood of a pulse disturbance disturbing the same two code words both in one and in the other line period is small, and on this fact satisfactory operation of the proposed facsimile circuit is based. The likelihood of disturbance can be further reduced by repeating the facsimile information not once but several times in successive line periods.

The superposition stage A3 is shown as a subtraction stage on the assumption that the information in the signal parts F' and F of the signals oFF'o and ooFF' occurs in an identical manner. If the bit information in the signal parts F' and F is inversed in polarity, the superposition stage A3 will be an addition stage.

What is claimed is

1. Television facsimile receiver for use with a transmitter in which the same facsimile information is transmitted per line period in the form of code words in at least two successive line periods in a television field blanking interval, the receiver comprising a circuit input means for receiving said successively transmitted information, a delay device coupled to said circuit input and having a delay time of one line period, a superposition stage coupled to said circuit input and to an output of the delay device, a signal detector having an input coupled to the superposition stage and an output, a change-over stage having a control input coupled to said superposition stage output, two signal inputs, and one signal output, a delay device having a delay time equal to at least the duration of a facsimile code word and coupled between said circuit input and one of said signal inputs, and a delay device having the same facsimile code word delay time coupled between said line period delay device and said remaining signal input.

2. Receiver as claimed in claim 1, further comprising a signal separator having an input means for receiving the video facsimile signal and an output coupled to said circuit input, and a signal processing and storing stage having an input coupled to said change over switch output and an output means for coupling to a television display device.

3. Television facsimile transmitter comprising, first means for transmitting facsimile information in the form of code words which occur in at least one line period in a television field blanking interval, and second means coupled to said first transmitting means for transmitting in at least one more successive line period in the field blanking interval the same facsimile information per line period.

4. Transmitter as claimed in claim 3, wherein said first transmitting means includes a signal separator having an input means for receiving said video facsimile signal, the facsimile information occurring in a line period in the field blanking interval, a first output for separated facsimile information, and a second output having said facsimile information, and said second transmitting means includes a delay device having a delay time of one line period, a superposition stage coupled to said separator and to said delay device, and a transmitting stage coupled to said superposition stage.

5. Transmitter as claimed in claim 3, wherein said transmitter operates in the VHF band.

* * * * *